(12) United States Patent
Mariella, Jr. et al.

(10) Patent No.: US 10,583,526 B2
(45) Date of Patent: Mar. 10, 2020

(54) LASER-DRIVEN HYDROTHERMAL PROCESSING

(71) Applicant: LAWRENCE LIVERMORE NATIONAL SECURITY, LLC, Livermore, CA (US)

(72) Inventors: Raymond P. Mariella, Jr., Danville, CA (US); Alexander M. Rubenchik, Livermore, CA (US); Mary A. Norton, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 397 days.

(21) Appl. No.: 14/653,770

(22) PCT Filed: Jan. 10, 2014

(86) PCT No.: PCT/US2014/011120
§ 371 (c)(1),
(2) Date: Jun. 18, 2015

(87) PCT Pub. No.: WO2014/113293
PCT Pub. Date: Jul. 24, 2014

(65) Prior Publication Data
US 2015/0321287 A1    Nov. 12, 2015

Related U.S. Application Data

(60) Provisional application No. 61/752,823, filed on Jan. 15, 2013, provisional application No. 61/752,901,
(Continued)

(51) Int. Cl.
*B23K 26/16*      (2006.01)
*B08B 7/00*      (2006.01)
(Continued)

(52) U.S. Cl.
CPC ............ *B23K 26/16* (2013.01); *B08B 7/0042* (2013.01); *B23K 26/0622* (2015.10);
(Continued)

(58) Field of Classification Search
CPC ...................................... B08B 7/0042
See application file for complete search history.

(56) References Cited

U.S. PATENT DOCUMENTS 5,538,764 A  *  7/1996  Li ........................... G21F 9/005
                                                      427/140
6,657,160 B2    12/2003  Hackel et al.
(Continued)

FOREIGN PATENT DOCUMENTS

EP       2316528      4/2011
JP    2003047923      2/2003
(Continued)

OTHER PUBLICATIONS

Vatry (Applied Surface Science 257 (2011) 5384-5388).*
(Continued)

*Primary Examiner* — Joel G Horning
(74) *Attorney, Agent, or Firm* — Harness, Dickey & Pierce, PLC

(57) ABSTRACT

Systems for processing a material by submerging the material in a fluid and directing laser pulses at the fluid and the material for processing the material. An embodiment removes the surface of concrete, brick, or rock or minerals in a relatively gentle, energy-efficient, and controlled manner that also confines the material that is removed.

10 Claims, 2 Drawing Sheets

Related U.S. Application Data filed on Jan. 15, 2013, provisional application No. 61/754,142, filed on Jan. 18, 2013.

(51) Int. Cl.

| | | |
|---|---|---|
| *B23K 26/0622* | (2014.01) | |
| *B23K 26/40* | (2014.01) | |
| *B23K 26/36* | (2014.01) | |
| *B23K 26/12* | (2014.01) | |
| *B23K 103/00* | (2006.01) | |

(52) U.S. Cl.
CPC .......... *B23K 26/1224* (2015.10); *B23K 26/36* (2013.01); *B23K 26/40* (2013.01); *B23K 2103/50* (2018.08)

(56) References Cited

U.S. PATENT DOCUMENTS

| | | |
|---|---|---|
| 7,521,001 B2 | 4/2009 | Brown et al. |
| 2002/0164873 A1 | 11/2002 | Masuda et al. |
| 2011/0092377 A1* | 4/2011 | Agrawal .............. G01N 21/643 506/7 |
| 2012/0282134 A1 | 11/2012 | Liu et al. |

FOREIGN PATENT DOCUMENTS

| | | |
|---|---|---|
| JP | 2012081453 | 4/2012 |
| WO | 9930865 | 6/1999 |

OTHER PUBLICATIONS

Dufay (J. Environ. Monit., 2006, 8, 630-633).*
R. Mariella Jr., "Laser Comminution of Submerged Samples," J. Appl. Phys. 114, 014904-1 to 014904-13 (2013).
International Search Report and (Correct) Written Opinion for PCT/US2014/11120 related to U.S. Appl. No. 14/653,770, 11 pages.
International Search Report and Written Opinion for PCT/US2014/01120 related to U.S. Appl. No. 14/653,770, 8 pages.

* cited by examiner

LASER-DRIVEN HYDROTHERMAL PROCESSING

CROSS-REFERENCE TO RELATED APPLICATIONS

This application claims benefit under 35 U.S.C. § 119(e) of U.S. Provisional Patent Application No. 61/752,823 filed Jan. 15, 2013 entitled "method and apparatus for laser processing of solids," the disclosure of which is hereby incorporated by reference in its entirety for all purposes.

This application claims benefit under 35 U.S.C. § 119(e) of U.S. Provisional Patent Application No. 61/752,901 filed Jan. 15, 2013 entitled "efficient laser-enhanced dissolution of minerals and debris via acid chemistry and hydrothermal conditions," the disclosure of which is hereby incorporated by reference in its entirety for all purposes.

This application claims benefit under 35 U.S.C. § 119(e) of U.S. Provisional Patent Application No. 61/754,142 filed Jan. 18, 2013 entitled "periodic application of laser-driven sample processing," the disclosure of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to processing and more particularly to Laser-Driven Hydrothermal Processing.

State of Technology

Removal of the surface of materials such as concrete, brick, and rock/minerals can be accomplished via grinding or intense abrasive water jets or electric-discharge shock chipping and flaking of concrete. Laser scabbling, which uses a 5 kW laser to heat concrete in air to its boiling/flaking/cracking point has been demonstrated. None of these processes employs transient dissolution of the surface as its primary mechanism and none offers gentle, μm-scale control of the material removal.

"Laser peening" uses intense laser pulses also directed at metal targets that are submerged in water, in order to generate a plasma and counter-propagating shock waves at the interface between the metal target and the water. The interaction between laser pulses and a metal target, whether submerged or not, is fundamentally different than the interaction between laser pulses and a dielectric target, such as concrete, brick, or rocks. Conductors, such as metals, possess vastly higher electrical conductivity than do dielectrics, and the laser light striking a metal target is absorbed entirely within a skin depth that is at most a few μm. Except in cases of extremely high-power laser pulses, whose use would be inappropriate for an energy-efficient, gentle, and controlled process, dielectric materials absorb light over a much longer penetration depth. Because metals absorb the laser pulses so strongly, it is not surprising that it is relatively easy to generate high temperatures and pressures at the interface between a submerged metal and the submerging fluid.

Hydrothermal processing is a technique to grow purified crystals of materials including quartz [$SiO_2$] and emerald [$Be_3(Al,Cr)_2Si_6O_{18}$]. Information about hydrothermal processing is provided in the article: "Pulsation processes at hydrothermal crystal growth (beryl as example)," *Journal of Crystal Growth* 206, 203-214 (1999) by V. G. Thomas, S. P. Demin, D. A. Foursenko, and T. B. Bekker and the article "Hydrothermal growth of α-quartz using high-purity α-cristobalite as feed material," *Materials Research Bulletin* 28, 1201-1208 (1993) by M. Hosaka and T. Miyata. Average growth temperature for beryl was ~600° C. and pressure was 1.5 kbar for pure water at given temperatures. The duration of runs was 15 to 25 days, growth rate was 0.1 mm/day. For quartz, the growth was carried out for 5-22 days. Quartz growth rates, in growth with high degree fillings exceeding 75%, were approximately 0.2-0.6 mm/day in the Z direction and approximately 0.1-0.2 mm/day in the X direction. Traditional hydrothermal processing requires containment vessels that can withstand sustained high temperatures and pressures and the process is very slow. Thus, traditional hydrothermal processes would have no practical application to treating large surfaces of buildings, etc.

SUMMARY

Features and advantages of the disclosed apparatus, systems, and methods will become apparent from the following description. Applicants are providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

This application covers apparatus, systems, and methods for processing a material by submerging the material in a fluid and directing laser pulses at the fluid and the material for processing the material.

It is an object to provide an improved means and method for removing matter from the surface of solid materials.

A further object is to provide a pulsed-laser-based method to remove the surface of concrete, brick, or rock or minerals in a relatively gentle, energy-efficient, and controlled manner that also confines the material that is removed.

A further object is to provide a pulsed-laser-based method to remove the surface of concrete, brick, or rock or minerals that can be submerged in a fluid or covered with a flowing fluid that can perform hydrothermal processing, at least in a transient manner, in a relatively gentle, energy-efficient, and controlled process that also confines the material that is removed.

A further object is to provide a pulsed-laser-based method to remove contamination from the surface of concrete, brick, or rock or minerals, included painted surfaces, including lead-based paints or surfaces contaminated with other heavy metal compounds that can be submerged in a fluid or covered with a flowing fluid in a relatively gentle, energy-efficient, and controlled process that also confines the material that is removed.

A further object is to provide a pulsed-laser-based method both to remove contamination from the surface of concrete, brick, or rock or minerals and to monitor the concentration of the contamination, real-time, while the decontamination is proceeding.

A further object is to provide a pulsed-laser-based method to perform decontamination of surfaces from beryllium and/or its oxides and other beryllium compounds or actinides and/or their oxides and other actinide compounds, using water as either a stagnant or flowing medium on the surface being decontaminated.

A further object is to provide a method for analyzing the concentrations of rare-earths in ores.

A further object is to provide a pulsed-laser-based analytical method to measure the concentration profile of various elements versus depth in concrete, brick, or rock or minerals.

A further object is to provide a rapid, relatively energy-efficient method to recrystallize materials that are amenable to hydrothermal processing.

Other objects and advantages will become apparent from the following description and accompanying drawings.

Additional information about Applicant's apparatus, systems, and methods are provided in the article: "Laser comminution of submerged samples," *Journal of Applied Physics* 114(2013) by R. Mariella, A. Rubenchik, M. Norton, and G. Donohue. The article, "Laser comminution of submerged samples," *Journal of Applied Physics* 114(2013) by R. Mariella, A. Rubenchik, M. Norton, and G. Donohue is incorporated herein by this reference for all purposes.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1A:
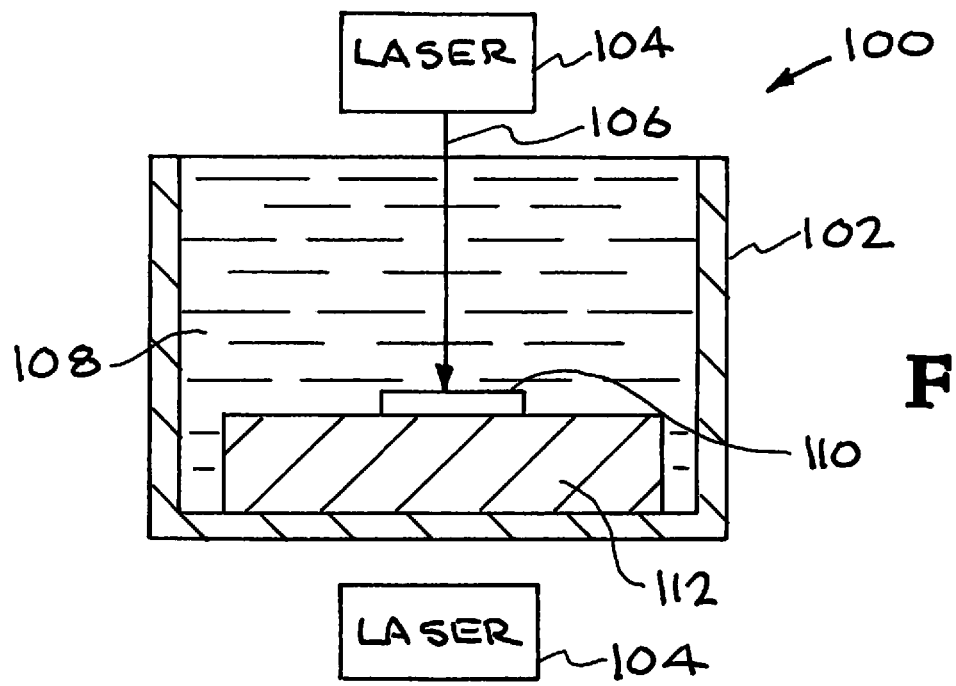
FIG. 1A illustrates the initial absorption and heating of the surface of the solid material.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

This application deals with the removal or alteration of material. Disclosed are apparatus and systems to implement a method that uses pulses of light energy to remove and/or alter a solid that is submerged in a fluid. The submerging fluid, which may be nominally stagnant or intentionally flowing/convected, needs to transmit the pulses of light energy and the solid needs to absorb these pulses of light energy at its surface. One apparatus and system is to use pulses of ultraviolet light from a laser as the source of pulsed light energy and to use water as the submerging fluid. There are at least three regimes of operation that are accessible with the new apparatus, systems, and methods:

Regime 1—Lower-power regime: purification/recrystallization of surface material via transient dissolution, Regime 2—Modest-power regime: removal of surface material via transient dissolution, and Regime 3—Higher-power regime: removal of surface material via transient dissolution and disruption of coherent/adherent forces within the solid.

Regimes 1 and 2 offer a controlled, relatively gentle, and well-confined method to remove and/or alter the surface of a solid. The target, then, may be concrete, brick, or a variety of rocks or minerals, as examples. If non-volatile toxic and/or radioactive contamination of the surface is present, then this laser-driven hydrothermal processing ["LDHP"] offers a new method and means to decontaminate the surface, while containing the removed hazardous material, especially with no release of hazardous aerosols in the process.

For silicate materials that are submerged in water, a purification/recrystallization of silica [$SiO_2$] is normally observed with LDHP.

When the target is concrete that is submerged, the LDHP can be adjusted effectively to un-cement the material that is adhering/bound to the surface, along with the surface of the concrete, itself. This includes removing paint and contamination of the concrete surface, including contamination that may be on the solid surface, within or underneath the paint.

Although one aspect of this application is the removal of material, the growth of purified crystals is another aspect that could be applied to the production of seed crystals or purification of surfaces of existing crystals, if their growth can be effected via a hydrothermal process.

One application of the gentle, controlled removal of material that LDHP offers is the profiling of contamination versus depth for analytical purposes, including the verification of decontamination that may have been performed, already.

Basically, this application is based upon the discovery of a new regime in Chemistry and Physics, namely a transient hydrothermal state, that can be accessed by passing modest-power laser pulses through a transparent submerging fluid and directing these pulses onto the surface of polycrystalline dielectric material such as concrete, brick, or rock, including painted versions of these. This new regime cannot be accessed, when the submerged target material is transparent to the laser light, such as is the case with visible or most ultraviolet light ["UV" light] and when the target is "UV-grade fused silica" for example. Because of this, one can use the apparatus, systems, and methods with a sample such as concrete, brick, rock, including painted samples, by passing the laser pulses through a UV-grade fused silica window as well as water or other transparent fluid in order to make the pulses strike the desired surface, as reported. The pulse duration and energy density ["fluence"] can fall within a fairly wide range and still produce the energy-efficient, gentle, and controlled, confined removal and/or recrystallization of the target material, but there needs to be sufficient energy deposited into the surface of the target material to heat both the target and the adjacent fluid, such as water, rapidly to higher temperature and pressure, at which point the fluid exhibits greatly-increased dissolving power of most or all of the target material. This process is based on several principles:

Transparency of the fluid to the laser pulses,
Absorbance of the laser pulses on the surface of the submerged solid target material,
Duration of the laser pulse being less than the rate of thermal conduction of the absorbed laser-pulse energy for the dimensions of the laser-pulse absorption,
If the increased dissolving power of the fluid depends upon increased pressure, then the duration of the laser pulse must be less than the time for the higher fluid pressure at the solid's surface to dissipate, and
Increased dissolving power of the fluid, due to the local heating of the solid surface and rapid conduction of this heat into the adjacent fluid.

Laser-Driven Hydrothermal Processing ["LDHP"].

As used in this application, the word "hydrothermal," means a circumstance in which a fluid is driven into a condition of temperature above room temperature and pressure above atmospheric pressure, in which condition the fluid exhibits greatly increased dissolving power of materials of interest. For example, with water, driving it into its supercritical state requires temperatures >374° C. and pressures >218 atm, and supercritical water dissolves quartz and other oxides to a much greater extent than does water at room temperature and atmospheric pressure.

As used in this application, the word "contaminants," means minority elements or minority compounds found in the main material.

Examples of the practice of Applicants methods and systems utilize:

1—a laser able to deliver onto the target material pulses of light with sufficient intensity [power per unit area] and fluence [energy per unit area] to produce rapid heating of a submerged target material;

2—a chamber or other method to contain the target material that is suspended in or covered with the fluid, such as liquid water, with at least one window, such as fused silica, that is transparent to the laser pulses or a method to produce a sheath or covering flow of fluid over the surface of the target material, such as water that is used in commercial laser peening;

3—a fluid that is transparent to the laser light and that, at higher pressures and temperatures, exhibits greatly increased dissolving power of the materials of interest;

4—a target material that is compatible with the submerging fluid and that absorbs the laser light strongly enough to become heated and, concomitantly, transiently heats and pressurizes the adjacent fluid so that it has increased dissolving power.

EXAMPLES

Applicants constructed and tested various examples of apparatus, systems, and methods: two lasers and three wavelengths of light have been used, successfully, as well as a range of fluences and light intensities, with concrete, brick, and quartzite targets. [Quartzite is a metamorphic rock, formed from what was originally sandstone.]

One laser was a custom-built laser based on a Nd:glass zig-zag slab amplifier, with fundamental output at 1053 nm, capable, with a frequency doubler, of emitting 527-nm light or, with a frequency tripler, 351-nm light, whose output is roughly rectangular, 15 mm×17 mm, with a nominally flat intensity profile and pulse duration adjustable between 8 and 20 ns. For some of the experiments, a UV-transmitting lens was used to decrease the spot size on the target surface.

A second laser was a commercial Excimer laser [Coherent-Lambda Physik LPX300 laser], generating 25-ns light pulses at 248-nm wavelength in a 12×30 mm spot. This latter laser was used with a UV-transmitting lens to decrease the spot size on the target surface.

The LDHP example experiments that are described in this application used stainless-steel chambers, open to the air and partially filled with deionized water, with UV-grade fused-silica windows to admit the laser pulses into the system. Although the Applicants have not attempted to enclose the chamber in which the LDHP has been studied, there is no fundamental reason that a sealed chamber, capable of operating at an intermediate temperature and pressure could not be used, nor is there any fundamental reason that a sealed chamber could not be used with a tube or other gaseous-flow device installed above the water or other fluid that could sample any gases that were released from the target surface by the LDHP laser pulses. This could include the intentional use of a flow of sampling gas, such as nitrogen or argon, to sweep away any released gases to a monitor, such as a mass spectrometer or ion-mobility spectrometer. This could be valuable, for example, if there were any radioactive materials within the solid target that had decayed into radon or other rare gas that had, subsequently, been trapped within the solid.

The LDHP example experiments that are described in this application used water as the submerging fluid; for transmission distances of a few cm or less, water is transparent to light with wavelengths from 1000 nm through 200 nm.

The effective absorption of the quartzite, concrete, brick was high enough to attain the conditions for hydrothermal processing of the material. Both the 527-nm and 351-nm laser wavelengths have demonstrated the LDHP, with the former primarily producing recrystallization of silica on the surface of quartzite at fluences of roughly 0.8 $J/cm^2$, and the 351-nm laser pulses primarily removing material from quartzite at fluences of 7 $J/cm^2$ and 3.5 $J/cm^2$. With concrete, the 351-nm laser at 0.4 $J/cm^2$ on concrete preferentially removed the cement. The 248-nm Excimer laser, with 0.6 J focused to a roughly 2 mm×5 mm spot primarily removed material from commercial quartzite flooring and removed cement, preferentially, from concrete aggregate.

Laser-Enhanced Dissolution and Recrystallization

Examination of the post-LDHP quartzite sample revealed one surprising phenomenon—surrounding the material-removal zone were relatively large, colorless crystals, which we later identified as relatively pure $SiO_2$. The colorless crystals that appeared on the quartzite were the indication that some modification of material was taking place at laser fluences even below the traditional ablation threshold. In our next experiment, we used an unfocused laser with 2.5-$cm^2$ area, directed onto a broken piece of concrete, and measured removal material that proceeded without having produced a visible crater. The resulting distribution of sub-pm-scale particles was virtually identical to that which we observed from a focused laser on quartzite [rock]. Weighing the sample demonstrated the weight reduction with removal rate 4.5*$10^4$ g/J or removal energy 2.2 kJ/g, which is much less than the evaporation energy for silica −10 kJ/g., hence our mechanism is more efficient than the direct evaporation. We explain the result by the fact that the transient, near-surface, hot, high-pressure water has greatly-enhanced dissolving power and effectively dissolved the heated solid surface, including the SiO2 component of quartzite, even though SiO2 is not soluble in water under atmospheric-pressure conditions.

Figure 1B:
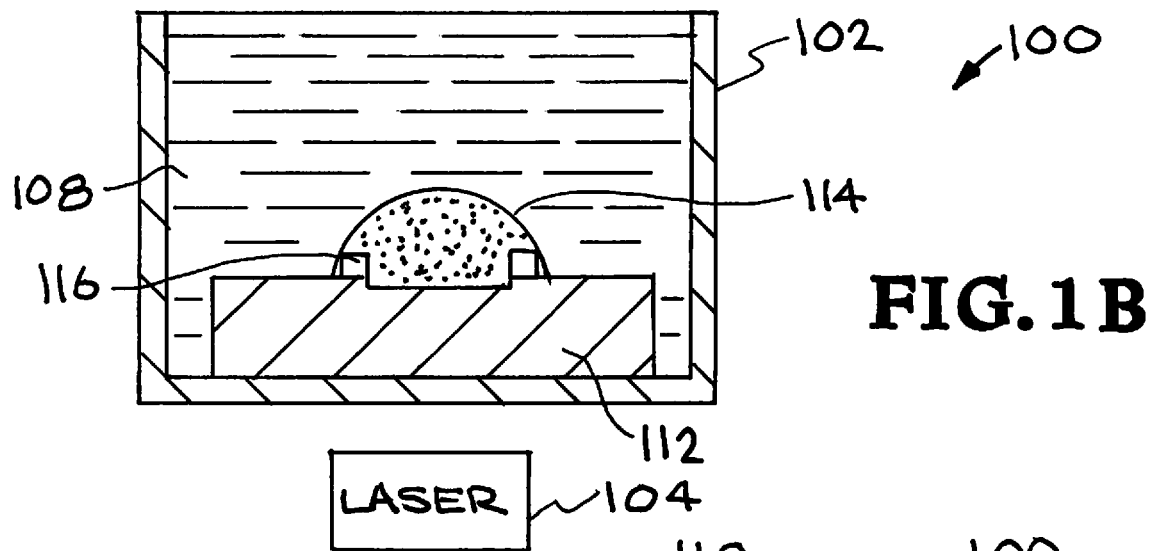
FIG. 1B illustrates the expansion of the transiently-heated and pressurized layer of water.
Figure 1C:
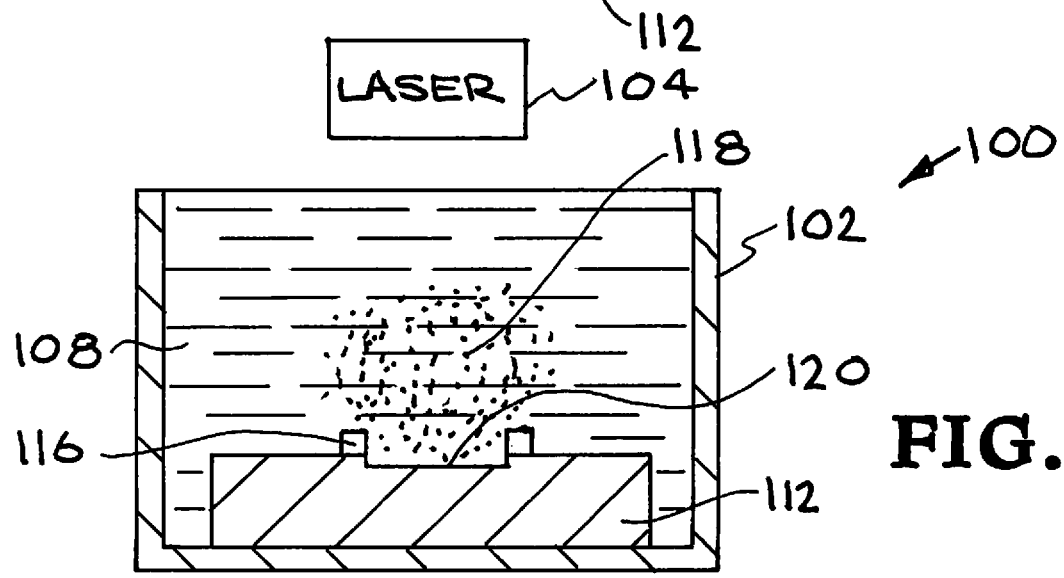
FIG. 1C illustrates the post-process rock and nearby water.

Referring now to the drawings and in particular to FIGS. 1A, 1B, and 1C; a schematic representation for the process is provided, using ultraviolet laser pulses, a silicate rock as the absorbing solid, and water as the submerging fluid. FIG. 1 A is an illustration of the initial absorption and heating of the surface of the solid material, which concomitantly heats the water and transiently dissolves most or all of a surface layer. FIG. 1B is an illustration of the expansion of the transiently-heated and pressurized layer of water, generating nanocrystals from the supersaturated solution that forms, as the layer cools and expands. FIG. 1C is an illustration of the post-process rock and nearby water, showing the possible suspension of the nanocrystals that formed as well as $SiO_2$ that recrystallized on the solid surface. The physical orientation of the solid target material is not pertinent, so long as the laser pulse illuminates the surface of interest and that surface is able to absorb the laser-pulse energy.

A test apparatus 100 is shown in FIGS. 1A, 1B, and 1C. The test apparatus 100 includes a vessel 102, a laser 104, a laser beam 106, a water bath 108, a superheated surface layer 110, and a solid 112. FIG. 1A illustrates the initial absorption and heating of the surface of the solid material 112, which concomitantly heats the water 108 and transiently dissolves most or all of the superheated surface layer 110.

FIG. 1B illustrates the expansion of the transiently-heated and pressurized layer of water 114, generating nanocrystals 116 from the supersaturated solution that forms, as the layer cools and expands.

FIG. 1C illustrates the post-process rock (i.e., solid 112) and nearby water 108, showing the possible suspension of nanocrystals 118 that formed as well as $SiO_2$ that recrystallized on the solid 112 surface. The physical orientation of the solid 112 target material is not pertinent, so long as the laser pulse illuminates the surface of interest and that surface is able to absorb the laser-pulse energy.

Applicants determined that the following sequence of events occurs: the absorption of the laser pulse on the surface of the solid 112 target heats the surface and collaterally generates a transient thin layer of high-pressure and high-temperature water 108, held by inertia, probably for time scales only of ns or µs, in contact with the concrete or other solid 112 surface. During this time, a hydrothermally-enhanced dissolution of the oxides and other components proceeds. As the thin layer 110 expands and cools, the transiently-dissolved substrate precipitates out, forming to a large extent sub-µm-scale particles and, when in direct contact with the solid 112 surface, some adherent crystals.

Applicants determined that if a second laser pulse were to strike the surface at the same time as when, or slightly before, the collapsing bubble struck the surface, then the local pressure and temperature, and hence, the dissolution, would be enhanced. Since it is likely that any application of laser comminution of concrete or other surfaces would be done with a pulse train, anyway, it would fit in rather well to tune the time separation of pulses to match the natural relaxation frequency of the formation and collapse of the bubble. Applicants estimate for their studies that used 0.4 J/cm² of 15-ns, 351-nm light that the relaxation time was 140 µs, based on published data from Alloncle, et al., shown below. That is, there may be a particularly efficient repetition rate for comminution of the surface, based on the natural relation time of bubbles that are formed on the surface.

Applicants observed narrow particle-size distributions 118 of the particles that were launched into the submerging water 108. The particle-size distributions from the different samples were similar to one another, and dissimilar to the grain and particle sizes in the solid targets.

Although, in principle, Applicants' apparatus, systems, and methods can be practiced with lower total energy per pulse and a smaller laser spot or with a Gaussian or other peaked intensity profile, the preferred embodiment is to use a higher-pulse-energy, flat-topped intensity profile, such as is produced by the SLAB laser, or quasi-flat-topped intensity profile, such as is commonly produced by commercial excimer lasers. If a laser with a peaked profile must be used, the preferred embodiment would be to incorporate a beam homogenizer, possibly with imaging optics to adjust the spot size to a desired surface area, to perform the processing. The reason for these considerations is that there is a minimum threshold of intensity-and-fluence in LDHP, so that a larger beam with a flat-topped intensity profile will utilize a larger fraction of the total beam spot on the target material for the LDHP, and will perform the process more uniformly than will a laser spot with a peaked intensity profile. The minimum threshold is material-dependent, with the lowest threshold that Applicants observed being that for the cement in concrete, at approximately 0.4 J/cm² in a UV-laser pulse between 8 and 25 ns, and the highest being that for light-colored sand or quartz, at approximately 1.5 to 2 J/cm² for similar-duration UV laser pulses.

Although if there are lasers that emit picosecond or femtosecond laser pulses, they would not be in our preferred embodiment, for one primary reason: no matter what the pulse duration, for any given wavelength of light, the solid target material needs to absorb sufficient light energy in order for the laser pulse to heat it, directly. Shorter laser pulses, therefore, must have higher intensities [fluence=Intensity*pulse duration] to deliver the same amount of energy to heat the target material and the adjacent fluid. Higher intensities carry with them the increased probability for causing dielectric breakdown and plasma at the interface between the solid target and its submerging fluid. Generating dielectric breakdown and plasma are undesirable for the LDHP because the LDHP needs intimate contact between the submerging fluid and the solid target being heated with the laser pulse.

Concrete, which normally contains Portland cement [heated $CaCO_3$], sand, and possibly larger pebbles, is an example of an impure material that is effectively un-cemented with this process. Evidence that the process incorporates a transient dissolution step is that the observed particle sizes do not depend upon the grains or particle sizes in the starting material [for cement, for example, the size distribution itself is extremely broad, typically spanning two or three decades from the submicrometer range to 100 µm], but resemble each other for a range of solid targets. The sub-µm nature of the distribution of particle sizes is also consistent with a rapid transition from dissolved layer through supersaturated layer through nucleation and growth of particles, forming a suspension or colloid.

Modest intensities and fluences can be and need to be used to produce an energy-efficient and confined process, because the process does not proceed via formation of a plasma—there is no dielectric breakdown. Indeed, as mentioned above, dielectric breakdown and plasma formation are undesirable, because intimate contact between the solid target and the submerging fluid is required for direct dissolution and formation of a plasma would disrupt the intimate contact. Also, the target material need not be heated to sublimation or boiling temperatures, which accounts for the much-improved energy efficiency of this process and its relatively gentle and confined nature.

A pressure vessel is not needed, since the fluid that surrounds the layer that is adjacent to the illuminated surface serves to confine the buildup of pressure and temperature in the layer of fluid that is adjacent to the surface. The mechanism for rapid removal of the cement in concrete [which is a mixture of $CaCO_3$ and CaO is unknown at this time, but there is evidence that high pressure, high-T water dissolves calcite, which is a form of $CaCO_3$.

Figure 2:
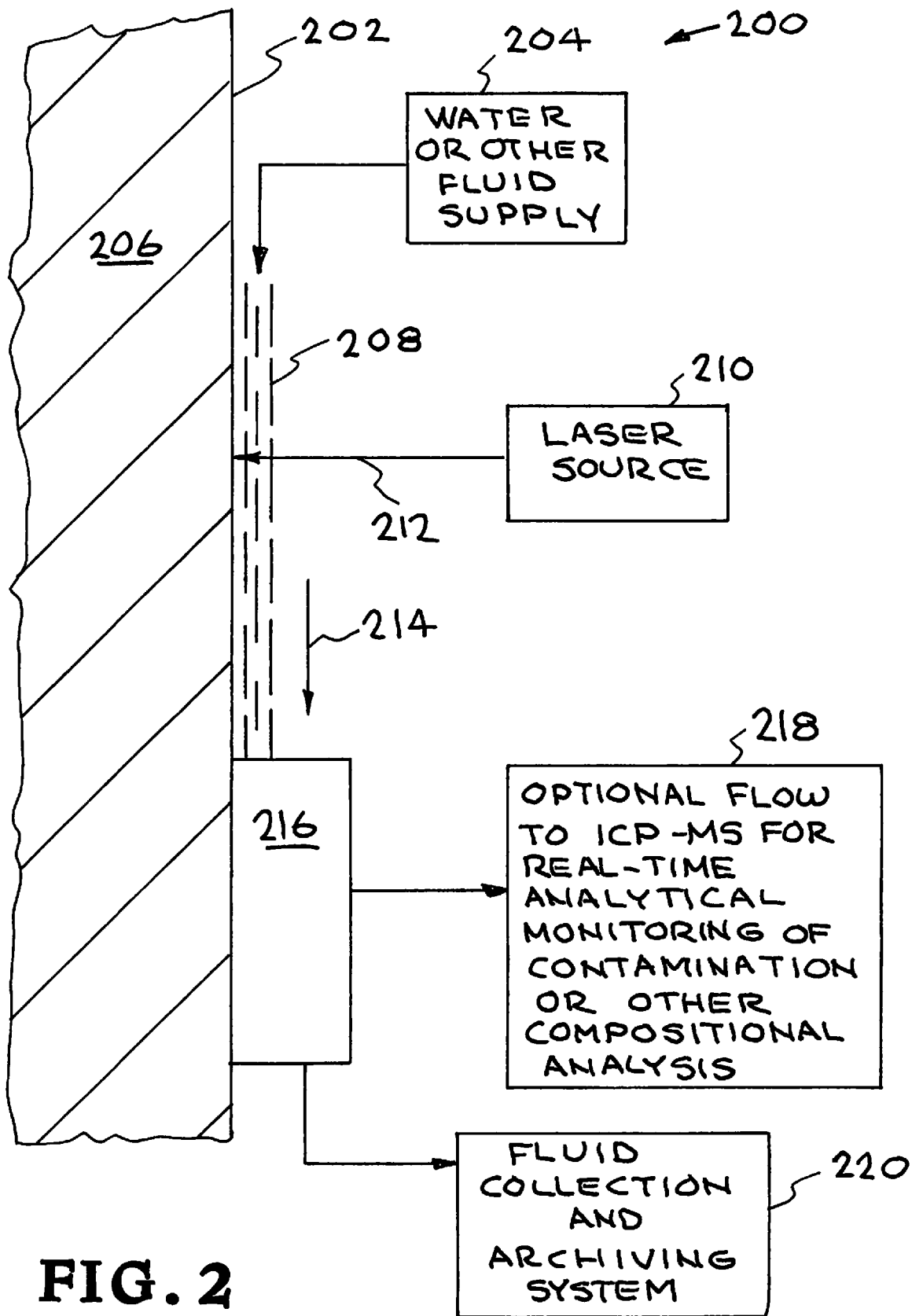
FIG. 2 illustrates an apparatus, system, and method for profiling.

Referring now to FIG. 2, an apparatus, system, and method for profiling is illustrated. The apparatus, system, and method are designated generally by the reference numeral 200. The apparatus, system, and method uses water 204 directed to the surface 202 being profiled. The water 204 forms a water sheath 208. A laser source 210 produces a laser beam 212. The laser beam 212 is directed to the water sheath 208 and the surface 202 being profiled. The water 204 moves in flow direction 214 to a waste collector 216. This provides flow for the fluid collection and archiving system 220. An optional flow 218 to ICP-MS for real-time analytical monitoring of contamination or other compositional analysis is shown.

The LDHP that is described, here, is a pulsed process. As such, each of the pulse energy and fluence can be tuned to remove material, gently, and in a contained manner. If the physical arrangement is one of a flowing sheath, the passing, such as water, collects all non-gaseous materials that were removed during that pulse and transports them away from the spot where the laser stuck the surface. By collecting the liquid flow which experiences each pulse, for example by sucking the fluid into a tube and passing that flow through a multi-receptacle receiver, the material removed by each pulse can be archived for later analysis in its own aliquot of fluid. Either with pre-knowledge of the overall process on the material of interest or by measurements made during the LDHP of the location of interest, the operator can, knowing the spot area and the depth of material removed, quantitatively convert concentrations of materials of interest in each aliquot to surface concentrations versus depth, thus profiling the concentrations of materials of interest. In this manner, one can measure the profile of concentration of a contaminant versus depth.

EXAMPLE

Profile of beryllium and its compounds versus depth in quartzite or similar flooring or building material [density=2.65 g/cm$^3$], with energy cost Q*=4 kJ/g [which equates to 10.6 kJ/cm$^3$], using water a flowing sheath over the quartzite surface and UV laser pulses at 248-nm wavelength.

Using a pulsed UV laser with spot size of 0.1 cm$^2$ and pulse energy of 0.2 J, then each laser pulse would remove a 0.00019-cm-thick layer of the quartzite, which can be expressed as 1.9 μm of depth removed per laser pulse. Thus, in principle, the concentration of beryllium as a contaminant can be measured with roughly 2-μm precision. Practical considerations, such as rate of water flow and sensitivity of the analytical technique for the various chemical forms of beryllium will limit the overall sensitivity of this profiling measurement.

In Applicant's discussions with cognizant individuals regarding the decontamination of beryllium-contaminated surfaces, it has been stated that the primary health risk associated with such surfaces is the [re-] aerosolization of the beryllium and/or its compounds, which can lead to inhalation and possible acute chemical pneumonitis or berylliosis.

The apparatus, systems, and methods described above of a transient hydrothermal process that transiently dissolves submerged rock, concrete, or brick, and, hence, intrinsically contains any contamination that is removed along with the surface, the presence of large equipment moving around a building as is it performing the decontamination could potentially disturb and aerosolize the beryllium contamination that is not submerged under a sheath of water. The apparatus, systems, and methods include preparing the surfaces, prior to laser treatment, in a manner that both prevents accidental Aerosolization of the beryllium contaminant and yet does not significantly impede the laser processing. In fact, it can serve as a visual indicator of progress in surface treatment—paint the surface! Normal paints consist of titanium dioxide with latex or other organic binder. These materials will be removed, readily, by the pulsed-UV-laser-driven hydrothermal process, exposing the underlying concrete, stone, or brick—while still submerged under a sheath of water and, thus, still confining and containing the beryllium contaminant. The net effect is to make the overall decontamination process environmentally safer, with reduced health risk.

While one is performing the profiling technique, described immediately above, one could attach a small tube with accurately-measured flow rate [such as 60 microliters/s] between the main flow and an ICP-MS, such as an Agilent 7500, with input nebulizer [and solvent stripper, if needed] so that the analytical instrument can provide immediate feedback about levels of contamination by Be and its compounds and similar contaminants, while simultaneously providing the capability to archive the majority of the removed material, in aliquots, if desired, traceable to the physical location of the point of their removal.

By measuring the ratio of the flow rate to the ICP-MS system to that of the main flow, one can convert the concentration of beryllium measured with the ICP-MS to the concentration of beryllium on the surface being profiled. This could be of considerable value if the LDHP profiling analytical procedure were being used as a confirmation for lack of presence of beryllium on a surface.

To accelerate the process Applicants suggest to use as a submerging liquid an acid or base or salt most suitable for a particular target material, thus increasing the dissolution rate, so long as the presence of these added chemicals to the fluid do not interfere with the transmission of the laser pulses to the surface of the target material. For example, all nitrates and acetates are soluble, so using dilute nitric or acetic acid may retain all metals in solution. Empirical studies are required to optimize this process.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of processing a material, wherein the material has a material surface and wherein contaminants are associated with the material surface; comprising the steps of:
providing a source of water;
directing said water from said source of water onto the material surface providing an interface between the material surface and said water, wherein a water sheath is produced at said interface between the material surface and said water;
providing a laser that produces a laser beam made up of a plurality of laser pulses;
directing said laser beam from said laser through said water sheath onto the material, onto the material surface with its associated contaminants,
while the material surface remains submerged under the water sheath, using said laser beam to create an interaction of said laser beam with the material, with the material surface, and with the contaminants,
wherein absorption of said laser beam by the said material generates a local temperature increase and a local pressure increase in the material surface, to produce a transient hydrothermal layer at the interface between said water and the material surface, and wherein the duration of each one of the laser pulses is less than the rate of thermal conduction of absorbed laser-pulse energy for the dimensions of laser-pulse absorption;
wherein said increased pressure the material surface produces a transient hydrothermal water layer adjacent to the material surface, and as the transient hydrothermal layer expands and contracts under a remainder of the water sheath, the transient hydrothermal layer dissolves a portion of the material surface at least 1.9 μm in depth, per laser pulse, in addition to at least partially removes the contaminants intrinsically contained with the original material surface, creating a new material surface, and creating a mixture of removed material from the material surface and removed contaminants which are captured in said water sheath and flow with said water sheath; and
providing a waste collector that receives said water sheath and said mixture of removed material and removed contaminants.

2. The method of claim 1, further comprising the steps of providing a fluid collection and archiving system and connecting said fluid collection and archiving system to said waste collector, wherein said fluid collection and archiving system receives said mixture of removed material and removed contaminants.

3. The method of claim 1, further comprising the steps of providing an inductively coupled plasma mass spectrometry system and connecting said inductively coupled plasma mass spectrometry system to said waste collector, wherein said inductively coupled plasma mass spectrometry system receives the mixture of removed material and said removed contaminants.

4. The method of claim 1, wherein:
the material surface comprises concrete;
the laser is based on a Nd:glass zig-zag slab amplifier, with output wavelength at 1053 nm; and
removal of a cement portion of the concrete occurs using a laser fluence of at least about 0.4 J/cm$^2$.

5. A method of processing a material, wherein the material has a material surface and wherein beryllium contaminants are associated with the material surface; comprising the steps of:
providing a source of water;
directing said water from said source of water onto the material surface providing an interface between the material surface and said water, wherein a water sheath is produced at said interface between the material surface and said water;
providing a pulsed laser that produces a pulsed laser beam having a plurality of laser pulses;
directing said pulsed laser beam from said pulsed laser through said water sheath onto the material, onto the material surface, and onto the beryllium contaminants,
wherein absorption of said pulsed laser beam by said material generates a local temperature increase and pressure increase within an absorbing layer of the material and beryllium contaminants, and wherein the duration of each one of the laser pulses is less than the rate of thermal conduction of absorbed laser-pulse energy for the dimensions of laser-pulse absorption, and the pulse duration is further from about 10 ns to about 10 μs, which produces a transient hydrothermal layer in the water at the interface between said water and the material surface, the local pressure and temperature being sufficient to cause the hydrothermal layer to remove portions of the material surface, wherein said transient hydrothermal layer at least partially transiently removes the material surface and some or all of the beryllium contaminants producing a mixture of removed material particles and removed beryllium contaminants particles that are dissolved and/or suspended in said water sheath, leaving behind a new material surface; and providing a waste collector that receives said water sheath containing its said mixture of removed material and said removed beryllium contaminants.

6. The method of claim 4, further comprising the steps of providing a fluid collection and archiving system and connecting said fluid collection and archiving system to said waste collector, wherein said fluid collection and archiving system receives said mixture of removed material particles and removed beryllium contaminants.

7. The method of claim 4, further comprising the steps of providing an inductively coupled plasma mass spectrometry system and connecting said inductively coupled plasma mass spectrometry system with said waste collector, wherein said inductively coupled plasma mass spectrometry system receives said mixture of removed material particles and said removed beryllium contaminants.

8. The method of claim 4, wherein:
the material surface comprises concrete;
the laser is based on a Nd:glass zig-zag slab amplifier, with output wavelength at 1053 nm; and
removal of a cement portion of the concrete occurs using a laser fluence of at least about 0.4 J/cm$^2$.

9. A method of processing a material, wherein the material has a material surface and wherein contaminants are associated with the material surface; comprising the steps of:
providing a source of fluid;
directing the fluid from the source of fluid onto the material surface providing an interface between the material surface and the fluid, wherein a fluid sheath is produced at the interface between the material surface and the said fluid;

providing a laser that produces a plurality of laser beam pulses, each said laser beam pulse having a predetermined pulse fluence;

directing the laser beam from the laser through the fluid sheath onto the material, onto the material surface, and onto the contaminants;

wherein the laser beam creates an interaction of the laser beam with the material, with the material surface, and with the contaminants;

wherein the laser beam predetermined pulse fluence is selected in relation to the material and the contaminants to be sufficient to generate a local pressure increase and a local temperature increase in the material surface, to produce a transient hydrothermal layer in the fluid at the interface between the fluid sheath and the material surface and wherein the duration of each one of the laser pulses is sufficiently short so as to be less than the rate of thermal conduction of absorbed laser-pulse energy for the dimensions of laser pulse-absorption;

wherein the increased temperature and pressure at the material surface produces said transient hydrothermal layer in the fluid that is adjacent to the material surface, and the transient hydrothermal layer gently dissolves a portion of the material surface and the contaminants intrinsically associated with the material surface, leaving behind a new material surface, and wherein a mixture of removed material from the material surface and removed contaminants mix together and are captured in the fluid sheath; and providing a waste collector that receives the fluid sheath and the mix of removed material and the removed contaminants.

10. The method of claim 9, wherein:

the material surface comprises concrete;

the laser is based on a Nd:glass zig-zag slab amplifier, with output wavelength at 1053 nm; and removal of a cement portion of the concrete occurs using a laser fluence of at least about 0.4 J/cm$^2$.

* * * * *